(12) United States Patent
Noel

(10) Patent No.: US 12,544,991 B2
(45) Date of Patent: Feb. 10, 2026

(54) FIBER PLACEMENT MACHINES WITH SCRAP RECOVERY

(71) Applicant: Fives Machining Systems, Inc., Fond du Lac, WI (US)

(72) Inventor: Michael A. Noel, Sunman, IN (US)

(73) Assignee: FIVES MACHINING SYSTEMS, INC., Fond Du Lac, WI (US)

( * ) Notice: Subject to any disclaimer, the term of this patent is extended or adjusted under 35 U.S.C. 154(b) by 361 days.

(21) Appl. No.: 18/136,981

(22) Filed: Apr. 20, 2023

(65) Prior Publication Data

US 2024/0351297 A1 Oct. 24, 2024

(51) Int. Cl.
*B29C 70/38* (2006.01)
*B23Q 11/00* (2006.01)

(52) U.S. Cl.
CPC ........ *B29C 70/384* (2013.01); *B23Q 11/0067* (2013.01)

(58) Field of Classification Search
CPC ............ B32B 37/0053; B32B 38/0004; B32B 38/1808; B29C 70/386; B29C 70/388
See application file for complete search history.

(56) References Cited

U.S. PATENT DOCUMENTS

2022/0134726 A1    5/2022   Boroughs et al.

FOREIGN PATENT DOCUMENTS

| CN | 105415707 A | 3/2016 |
| CN | 103707515 B | 5/2017 |
| CN | 110303692 A | 10/2019 |
| KR | 19980017538 U | 7/1998 |

OTHER PUBLICATIONS

International Search Report for International Application No. PCT/US2023/019197 dated Jan. 18, 2024 (3 pages).
Written Opinion for International Application No. PCT/US2023/019197 dated Jan. 18, 2024 (4 pages).

*Primary Examiner* — Thu Khanh T. Nguyen
(74) *Attorney, Agent, or Firm* — Pillsbury Winthrop Shaw Pittman LLP

(57) ABSTRACT

A scrap collection assembly for use with a fiber placement machine, including a scrap bin configured to receive scrap pieces of composite tape; a first roller assembly, including a roller configured to engage one side of a scrap piece of composite tape, coupled to the scrap bin; a second roller assembly, including another roller configured to engage an opposite side of the scrap piece of composite tape, coupled to the scrap bin, such that the rollers move to engage opposite sides of the scrap piece, pull the scrap piece from a fiber placement machine, and deposit the scrap piece in the scrap bin.

10 Claims, 14 Drawing Sheets

FIBER PLACEMENT MACHINES WITH SCRAP RECOVERY

TECHNICAL FIELD

The present application relates to fiber placement machines and, more particularly, to a scrap recovery system used with fiber placement machines.

BACKGROUND

Fiber placement machines are used to create composite workpieces. Composite material, in the form of fibrous material impregnated with resin, is applied by the machines to a mold or mandrel at precise locations and lengths to collectively form a composite workpiece. The fiber placement machines move a fiber placement head over the mold to precisely apply composite tape in the ultimate shape of the composite workpiece. As the fiber placement head moves, it leaves a plurality of composite tape segments, also referred to as course, or tows, behind on the mold.

The composite tape segments can vary in length and the fiber placement head can selectively cut the composite material to create a tape segment having a defined length. As part of the cutting process, a scrap segment may be created and held by the fiber placement head after application of the tape segment to the mold. Before applying additional tape segments, the scrap segment should be removed from the fiber placement head. Efficiently removing the scrap segments can help speed composite workpiece formation.

SUMMARY

In one implementation, a scrap collection assembly for use with a fiber placement machine, includes a scrap bin configured to receive scrap pieces of composite tape; a first roller assembly, including a roller configured to engage one side of a scrap piece of composite tape, coupled to the scrap bin; a second roller assembly, including another roller configured to engage an opposite side of the scrap piece of composite tape, coupled to the scrap bin, such that the rollers move to engage opposite sides of the scrap piece, pull the scrap piece from a fiber placement machine, and deposit the scrap piece in the scrap bin.

In another implementation, a scrap collection assembly for use with a fiber placement machine, includes a scrap bin, configured to receive scrap pieces of composite tape, open at one end; a first roller assembly, including a roller configured to engage one side of a scrap piece of composite tape, pivotably attached to the scrap bin; a second roller assembly, including another roller configured to engage an opposite side of the scrap piece of composite tape, pivotably attached to the scrap bin, such that the first roller assembly and the second roller assembly move about pivots to engage a scrap piece on opposite sides, rotate the roller of the first roller assembly, and pull the scrap piece into the scrap collection bin.

DETAILED DESCRIPTION

A fiber placement machine can include a scrap removal assembly within a workspace where the machine applies composite tape segments to a mold. The scrap removal assembly can be positioned within the workspace such that the fiber placement head can be moved into contact with the assembly and excess or unwanted scrap segments may be pulled from the head. The scrap removal assembly is located apart from the fiber placement head. During the scrap removal, a robotic arm can move the fiber placement head to the position in the workspace where the scrap removal assembly is positioned. The scrap removal assembly can include a pair of rollers that can move or pivot to confront each other and engage opposite surfaces of the scrap segment exposed from the fiber placement head. At least one of the rollers can be rotationally driven to automatically pull the scrap segment from the fiber placement head and deposit the segment into a collection bin. The collection bin can be emptied later, for instance while the machine is idle. In the past, a human operator may be tasked with removing scrap segments. However, the scrap removal assembly can eliminate the task of human effort to remove scrap segments.

Figure 1:
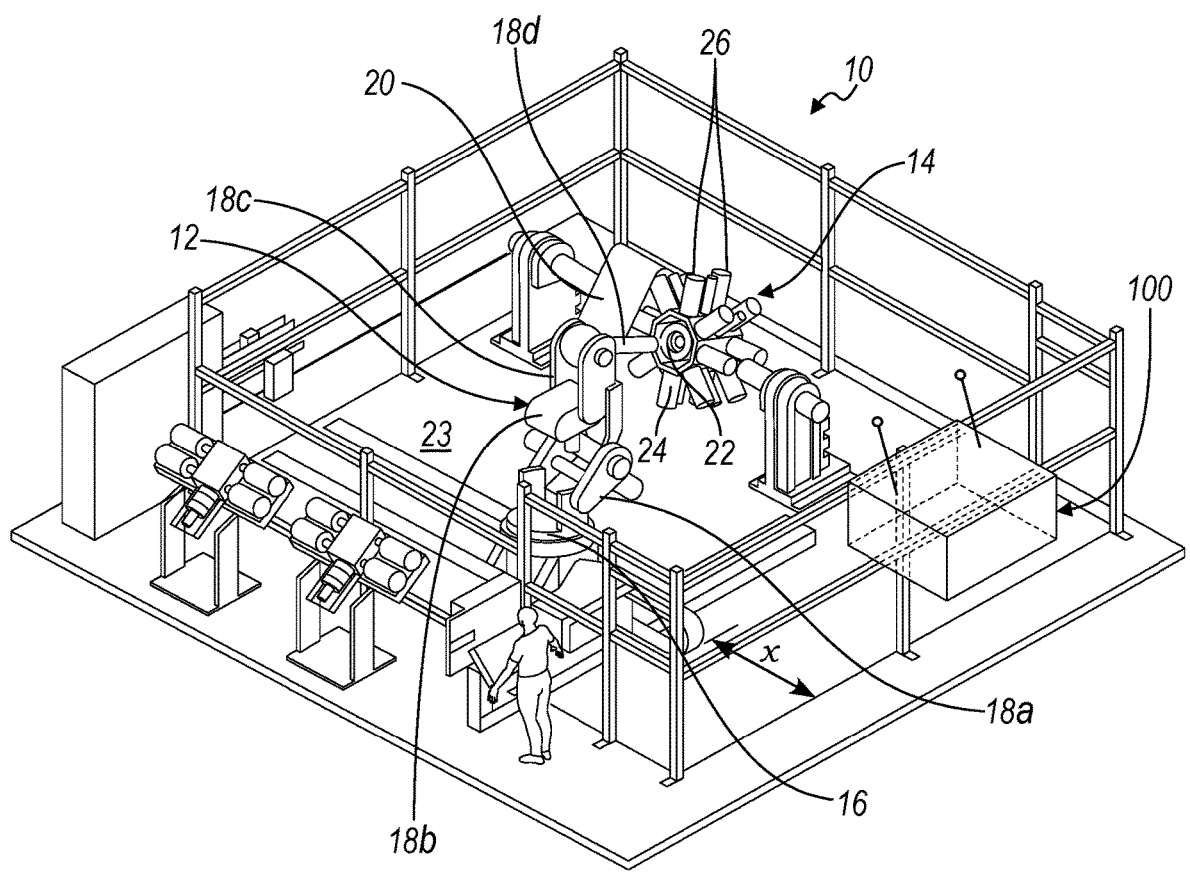
FIG. 1 is a perspective view depicting an implementation of a fiber placement machine.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece. A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory. Communications between the mechanism that moves the robotic arm, such as the fluidic rams or electric motors, and the microprocessor can be carried out over a communications bus. The robotic arm 12 can move the fiber placement head 14 along three axes to position the head 14 for service or to apply composite tape to the mold 20. While this is one implementation of a robotic arm 12 that can be used with a fiber placement head, other implementation of robotic arms or mechanical devices that apply composite tape can be used as well.

The end of the robotic arm 12 distal to the base 16 can include a chuck 22 that releasably engages the fiber placement head 14. The chuck 22 and a portion of the fiber placement head 14 can have corresponding features such that the chuck 22 releasably grabs the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12. Most components of the fiber placement machine 10 are positioned and operate within a workspace 23, while human operators of the machine 10 are positioned outside of the workspace 23.

Figure 2:
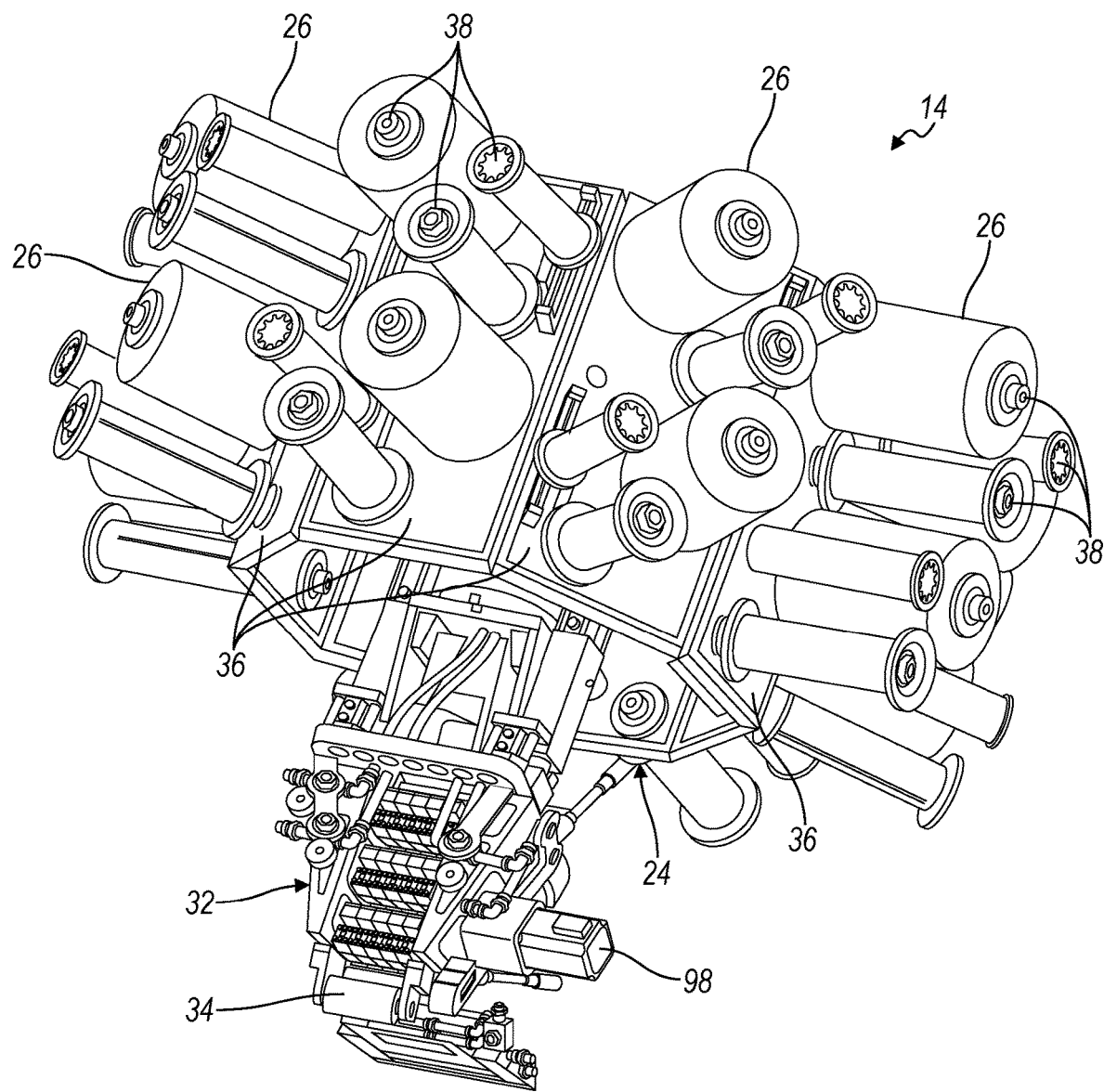
FIG. 2 is another perspective view depicting an implementation of a fiber placement head.
Figure 3:
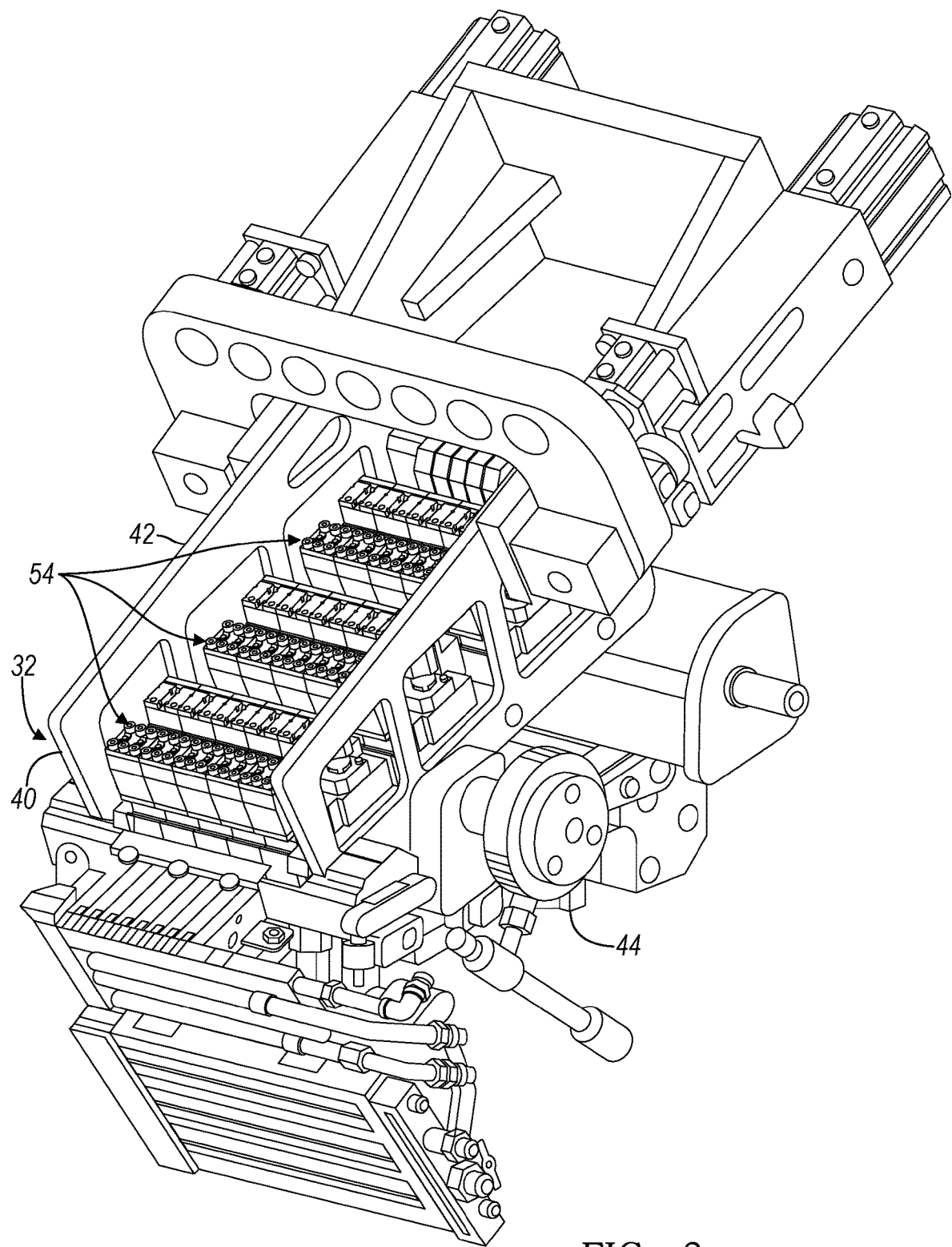
FIG. 3 is a perspective view depicting an implementation of a portion of a fiber placement head.
Figure 4:
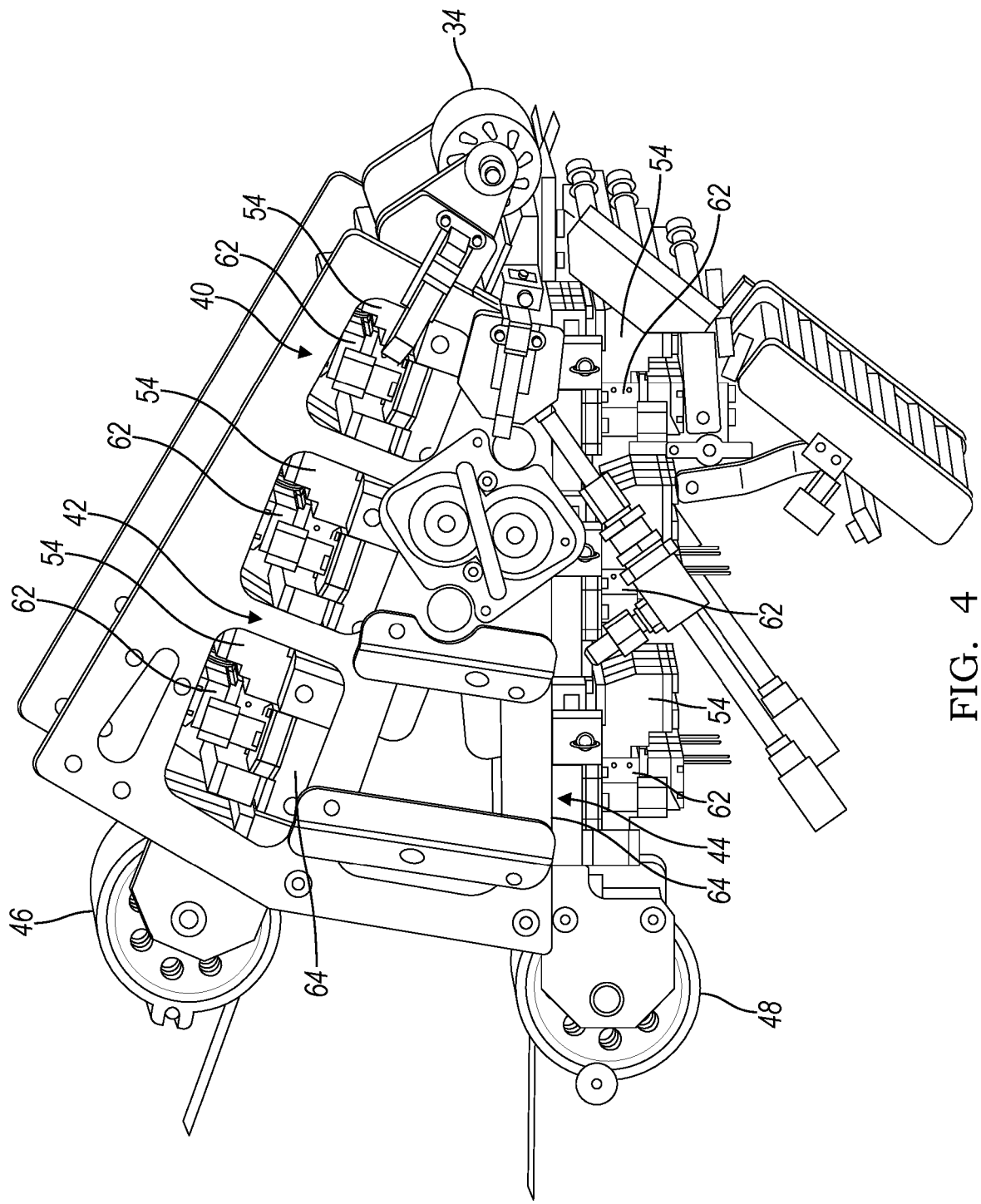
FIG. 4 is another perspective view depicting an implementation of a portion of a fiber placement head.
Figure 5:
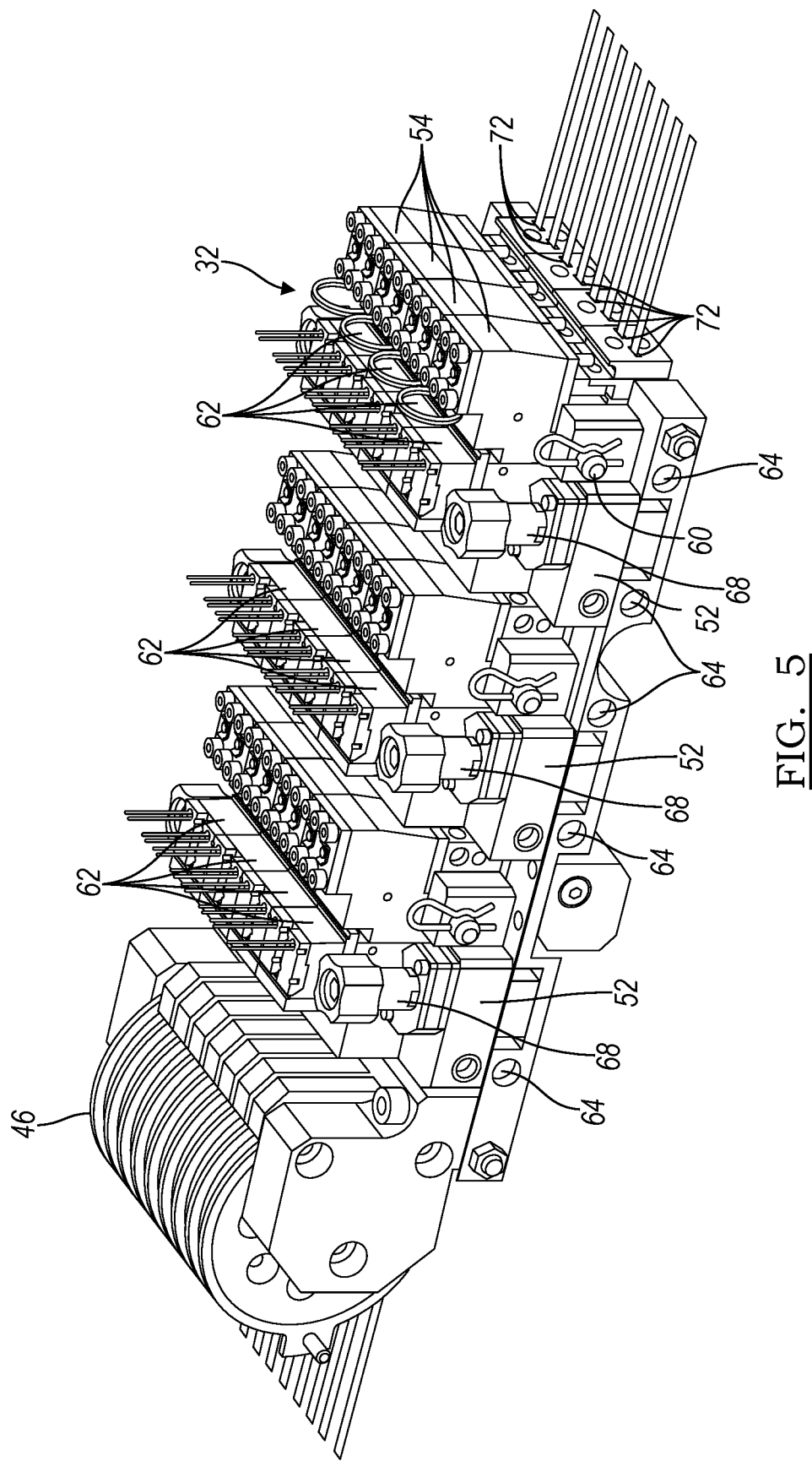
FIG. 5 is another perspective view depicting an implementation of a portion of a fiber placement head.
Figure 6:
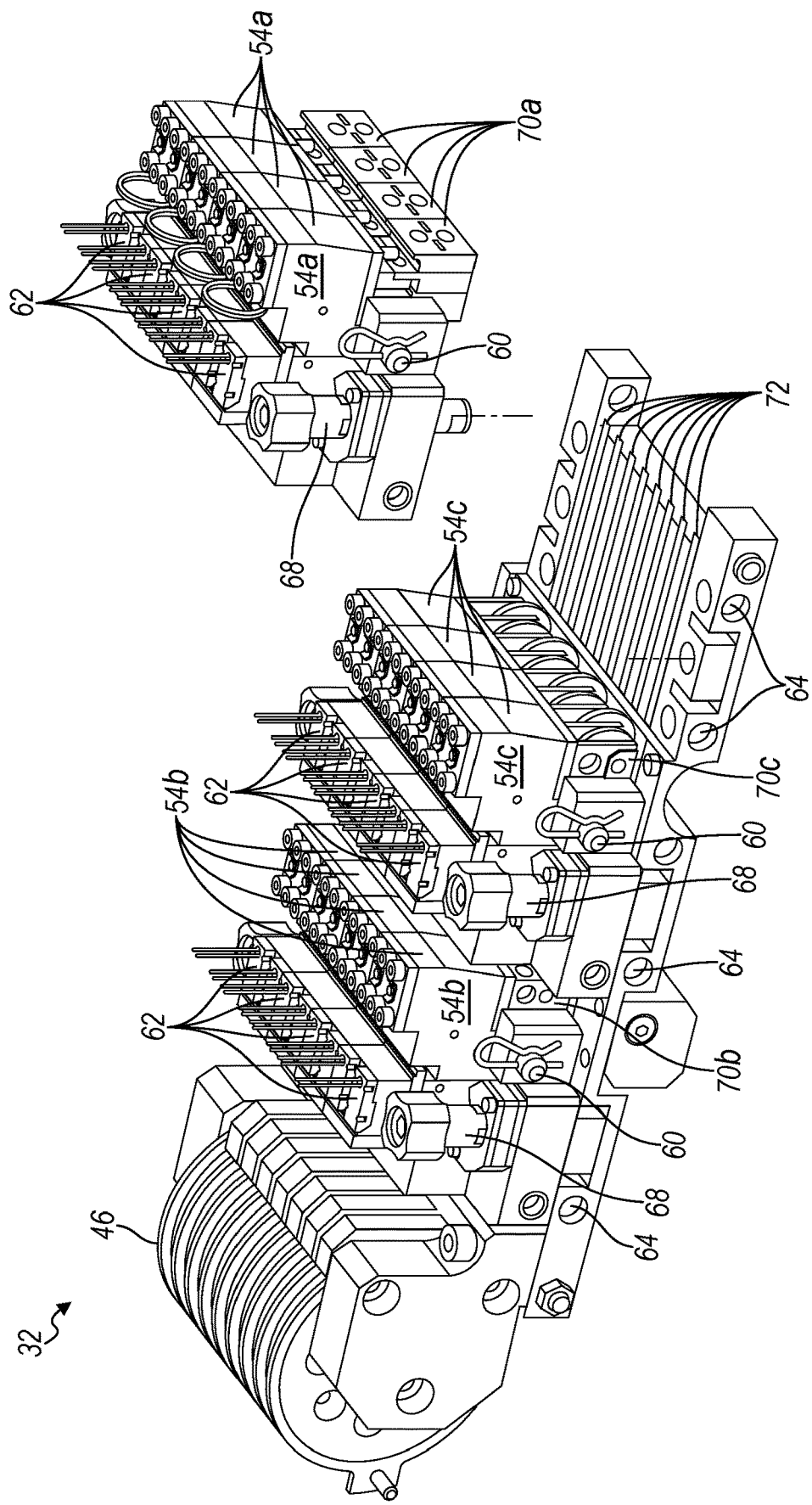
FIG. 6 is another perspective view depicting an implementation of a portion of a fiber placement head.
Figure 7A:
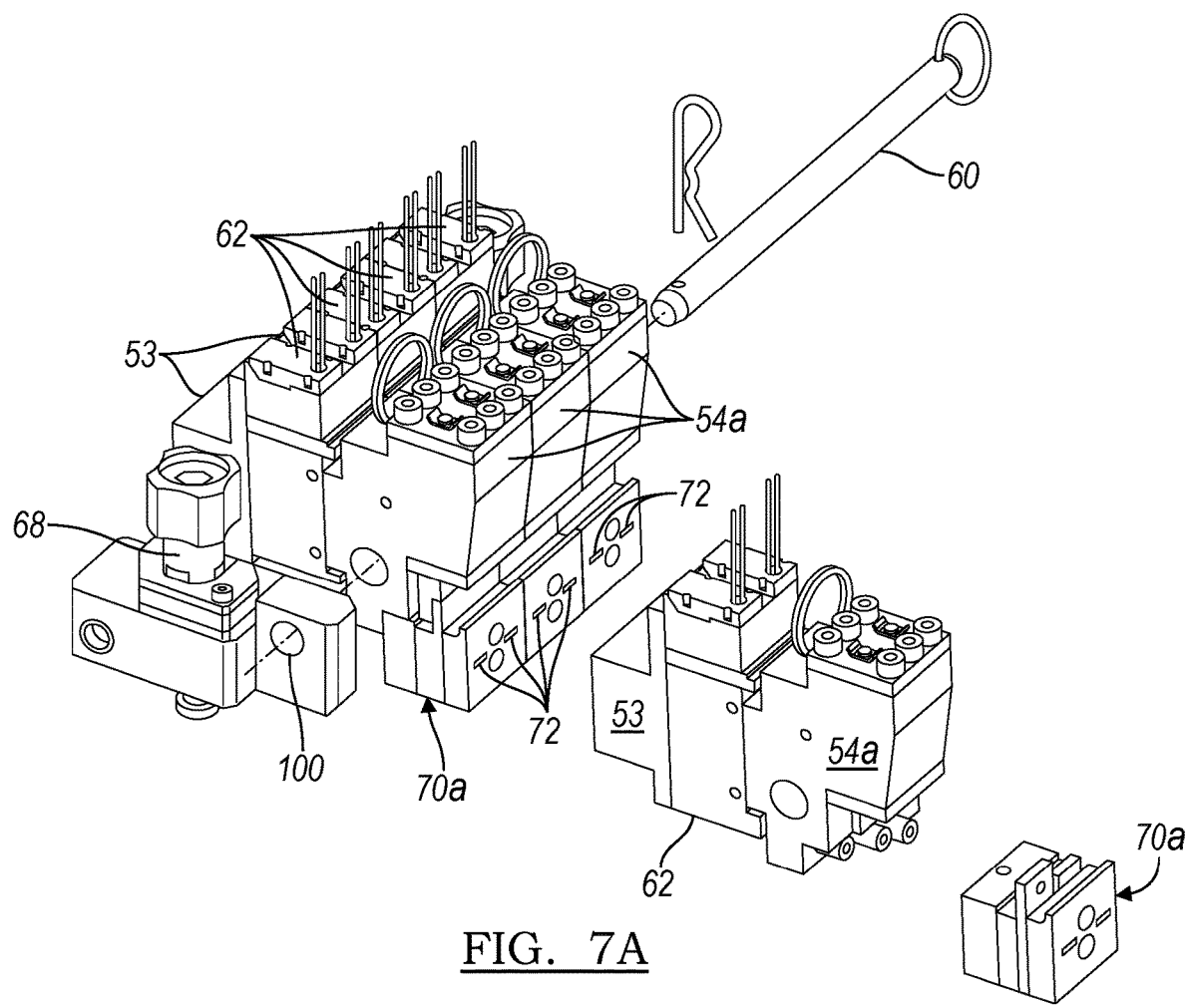
FIG. 7a is another perspective view depicting an implementation of a portion of a fiber placement head.
Figure 7B:
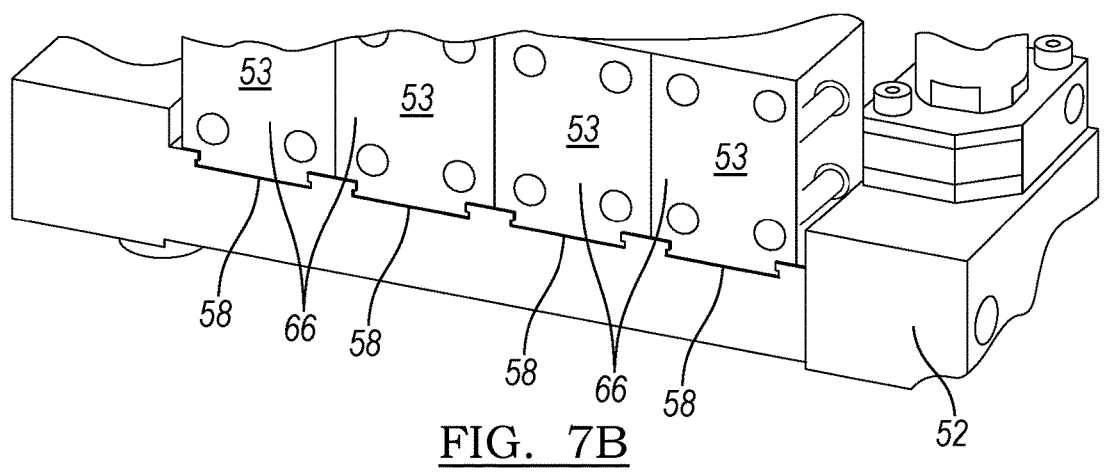
FIG. 7b is another perspective view depicting an implementation of a portion of a fiber placement head.
Figure 8:
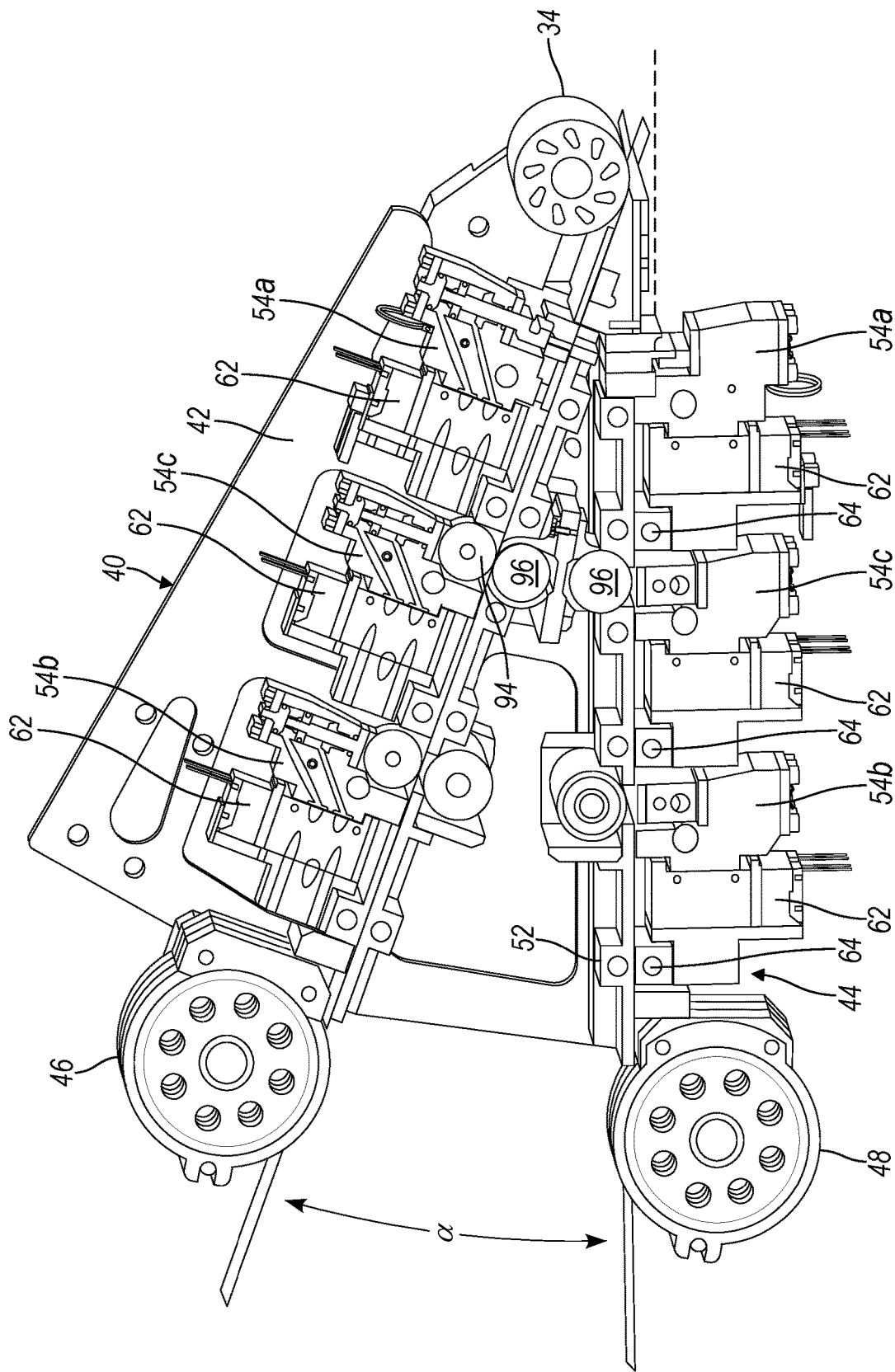
FIG. 8 is a cross-sectional view depicting an implementation of a portion of a fiber placement head.
Figure 9:
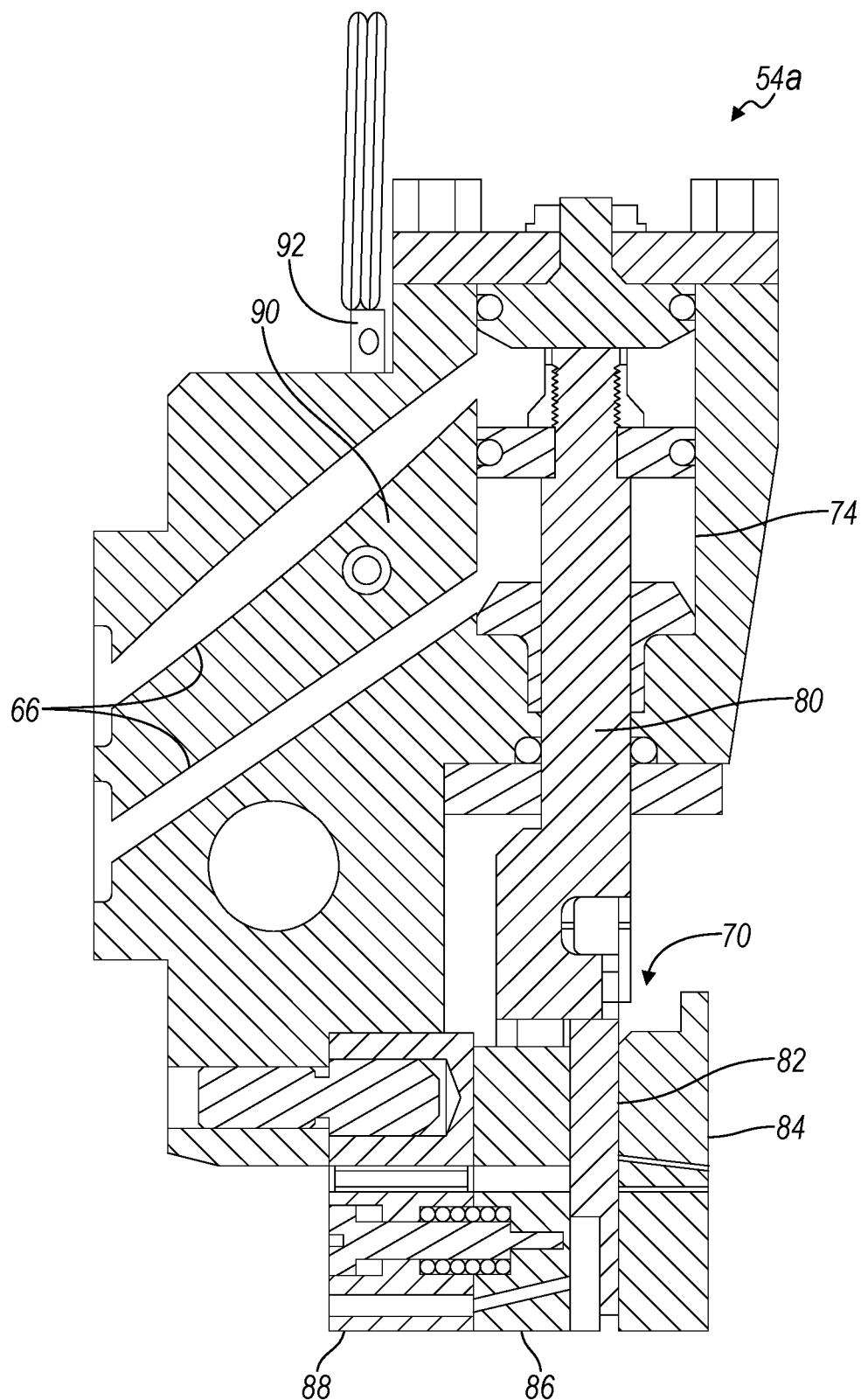
FIG. 9 is a cross-sectional view depicting an implementation of a portion of a fiber placement head.
Figure 10:
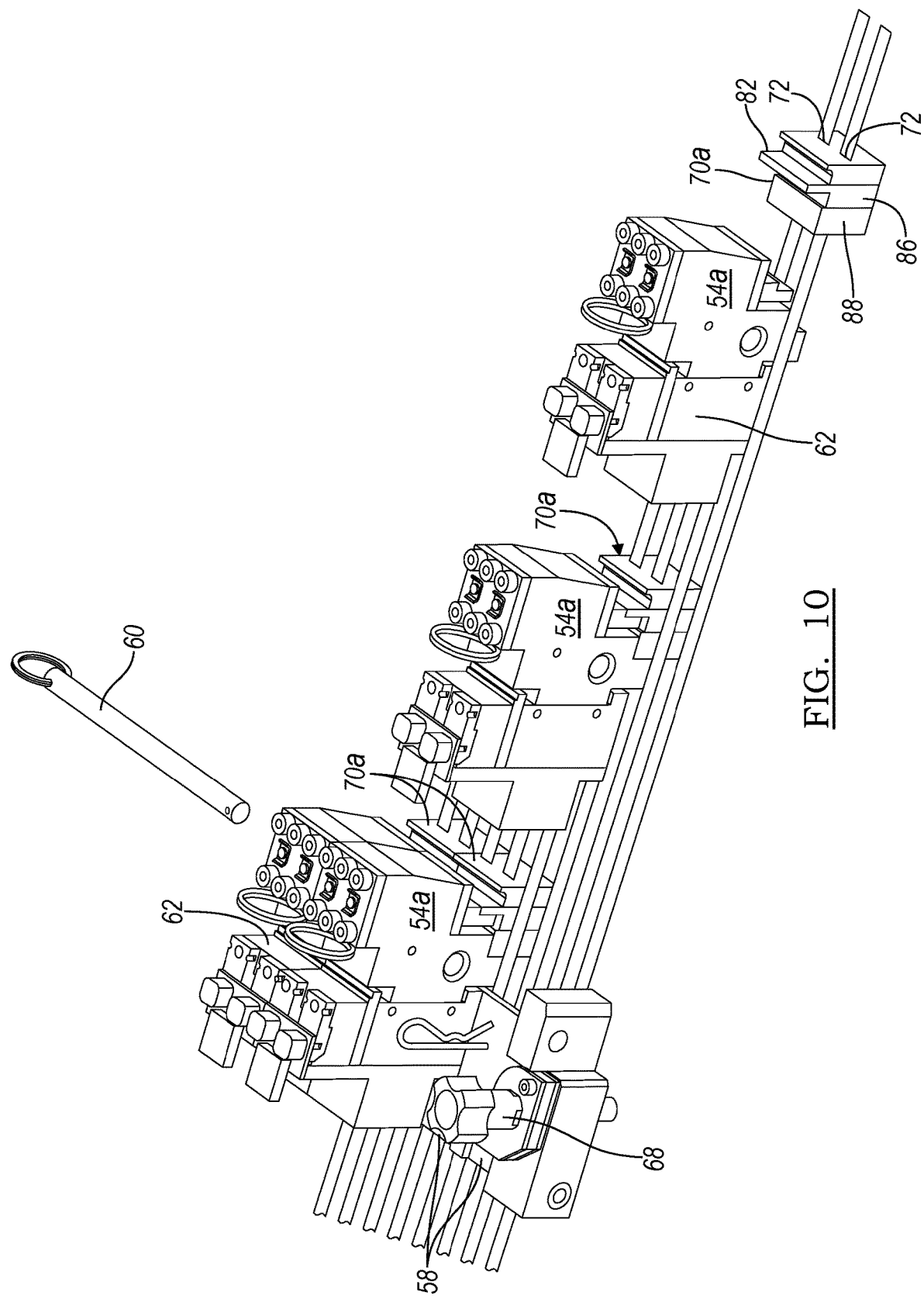
FIG. 10 is another perspective view depicting an implementation of a portion of a fiber placement head.
Figure 11:
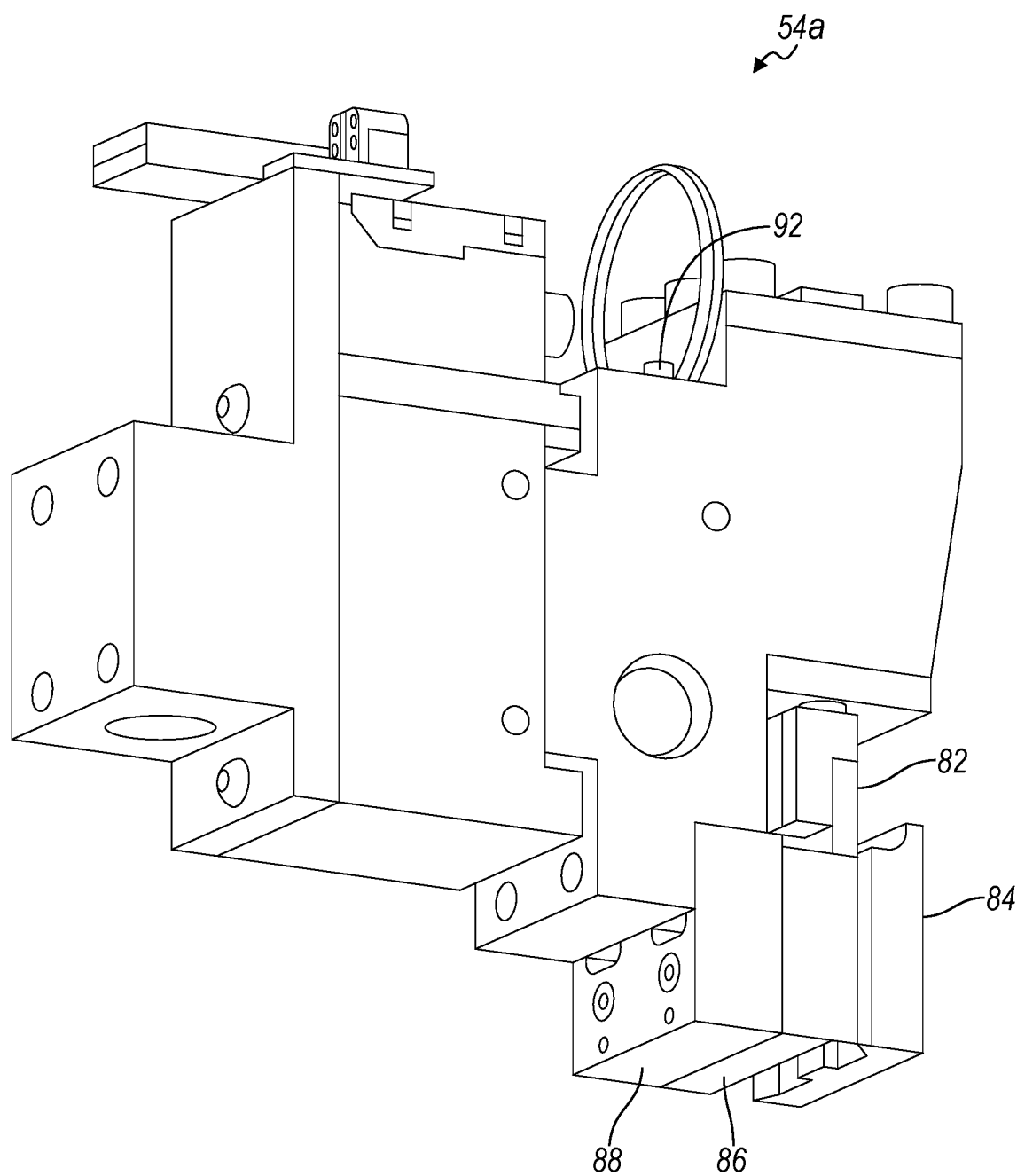
FIG. 11 is another perspective view depicting an implementation of a portion of a fiber placement head.
Figure 12:
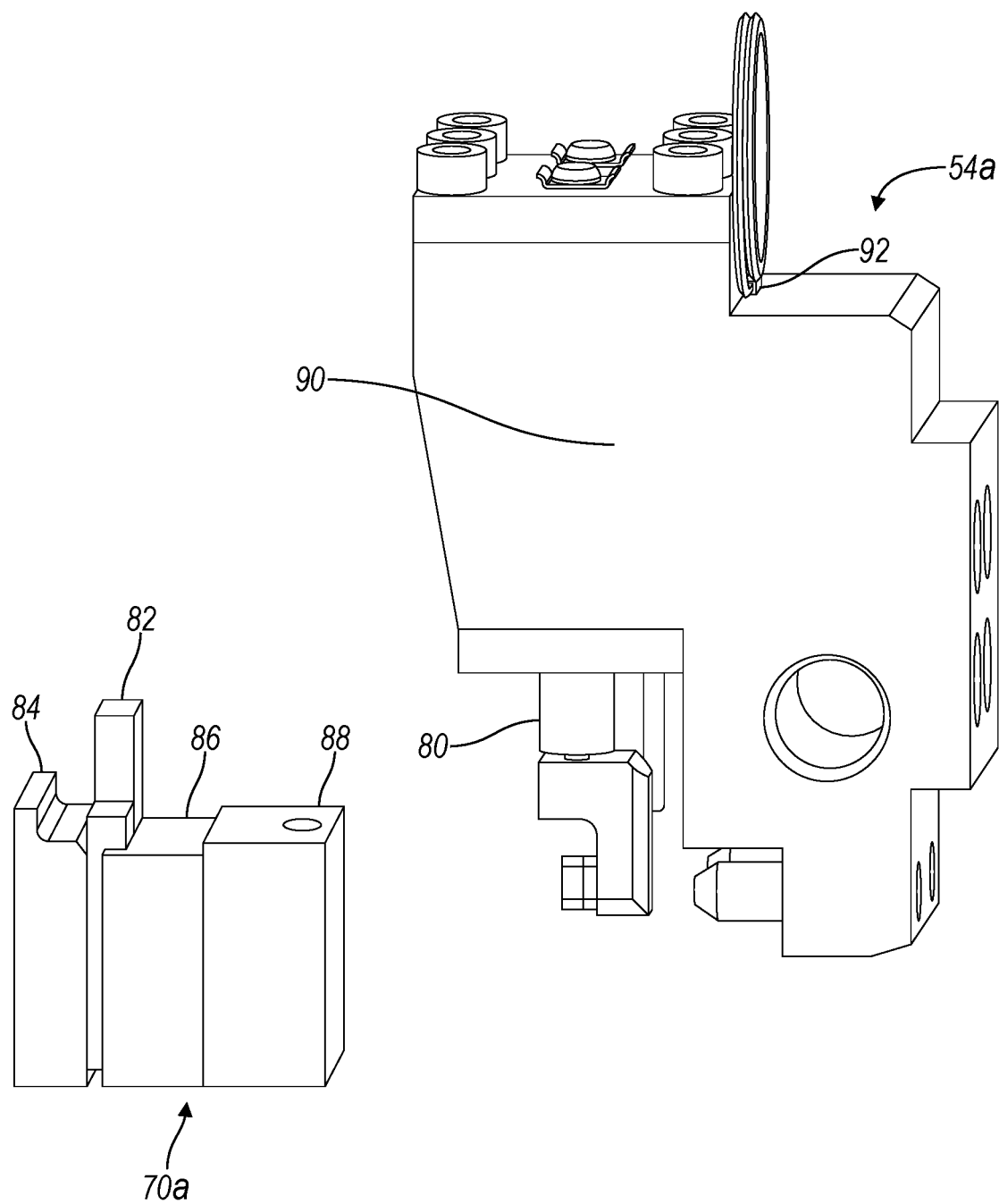
FIG. 12 is another perspective view depicting an implementation of a portion of a fiber placement head.

As shown in FIGS. 2-4, the fiber placement head 14 can include a creel 24, a plurality of spools 26 that carry composite tape as a source of this tape for the head 14, and a cut, clamp, restart (CCR) assembly 32. The CCR assembly 32 can include a compaction roller 34 (or alternatively a compaction slide) that can receive the composite tape from the spools 26 and apply it to the mold 20 to create a composite part. The creel frame 24 includes a plurality of outer surfaces 36 and spindles 38 mounted orthogonally relative to the outer surfaces 36. The spindles 38 can be moved to create tape tension using dancer elements controlled pneumatically, mechanically, or fluidically that help maintain tension on the composite tape as the tape is applied to the mold 20. The composite tape can unwind from the spools 26 and travel into the compaction roller 34 for ultimate application to the mold 20. Composite tape that is used to create workpieces often is comprised of fibrous material which has been impregnated with a resin that later provides strength to the workpiece after the resin is activated with heat. One example of a composite is carbon fiber. This is often referred to as "pre-preg" composite.

The fiber placement head 14 can include a CCR frame 40 for supporting the components of the fiber placement head 14, the CCR assembly 32, and the compaction roller 34 that ultimately presses the course of composite tapes onto the mold 20. Before arriving at the compaction roller 34, a portion of the composite tapes can pass through an upper feed portion 42 and another portion of the composite tapes can pass through a lower feed portion 44. The upper feed portion 42 can process even numbered composite tape and the lower feed portion 44 can process odd numbered composite tape that meet at the compaction roller 34. For instance, for a fiber placement head 14 having eight fiber pathways or lanes, the upper feed portion 42 can process composite tape identified by numbers 2, 4, 6, and 8 while the lower feed portion 44 can process composite tape identified by numbers 1, 3, 5, and 7. The upper feed portion 42 and the lower feed portion 44 can be separated by an angle ($\alpha$). An upper feed roller 46 and lower feed roller 48 can communicate composite tape from spools 26 to the upper feed portion 42 and lower feed portion 44, respectively. A plurality of lane assemblies 54 can be included with the upper feed portion 42 and the lower feed portion 44. Each of the upper feed portion 42 and the lower feed portion 44 can include a manifold 64 for receiving a plurality of mounting bases 52 that can releasably receive a plurality of the lane assemblies 54.

Turning to FIGS. 5-8, the mounting base 52 can include valve attachments 68 that locate the base 52 relative to the manifold 64 and releasably couple a plurality of lane assemblies 54 relative to the fiber placement head 14. The valve attachments 68, such as a ball lock that locates the fluid passageways 66 from the mounting base 52 to the manifold 64, and helps form a fluid-tight seal between the rear air block 53 and the base 52. The base 52 includes a plurality of attachment sites 58 (FIG. 7b) where the lane assemblies 54 ultimately couple to the base 52. The base 52 can be a discrete element that couples to the manifold 64 in which a plurality of electromagnetic valves 62 and lane assemblies 54 can be removed or installed simultaneously. In one implementation, the attachment site 58 can be a female dovetail that receives a corresponding male dovetail included with an element of the lane assembly 54 or a rear air block 53. The lane assemblies 54 can slide relative to the mounting base 52 via the dovetail connection during installation or removal of the assemblies 54 with respect to the fiber placement head 14. However, a plurality of lane assemblies 54 can ultimately be fixed to the mounting base 52 with a cross pin 60 that passes transverse to the direction in which the assembly 54 slides with respect to the dovetail and engages a portion of the mounting base 52 to prevent the movement of the lane assemblies 54 relative to the mounting base 52.

Electromechanical valves 62 can abut the lane assemblies 54 and can be coupled to the mounting base 52 via a rear air block 53. Each lane assembly 54 can abut an electromagnetic valve 62 such that the valve 62 selectively supplies compressed air to the assembly 54 for actuation. The mounting base 52 can couple with the manifold 64 and fluid passageways 66 communicate compressed air from a source (not shown) through the rear air block 53 and the electromechanical valves 62 ultimately arriving at the lane assemblies 54 coupled to the base 52. An assembly of a rear air block 53, an electromagnetic valve 62, and a lane assembly 54 can be removably secured to the mounting base 52 using the cross pin 60. Compressed air can be selectively supplied to a lane assembly 54 by the electromagnetic valve 62 thereby communicating the air from the manifold 64 and the rear air block 53. In one implementation, the electromagnetic valve 62 includes a solenoid receiving a voltage that is controlled by a switch the microprocessor opens and closes to control actuation of the lane assembly 54.

Turning to FIGS. 9-12, lane modules 54 can each include a subassembly 70 that carries out a function of the fiber placement head 14 and one or more lane paths 72 through which composite tape passes. A pneumatic cylinder 74 for each subassembly 70 can control the function of the fiber placement head 14. An element of the subassembly 70 can be coupled with the pneumatic cylinder 74 and flow of compressed air into the pneumatic cylinder 74 from the manifold 64 can have an effect on the composite tape passing through the lane paths. In one embodiment, fluid passages 66 can communicate compressed air from an electromechanical valve 62 to a pneumatic piston assembly 80 that includes a piston. The pneumatic piston assembly 80 can slide relative to the cylinder 74 thereby performing some action on the composite tape depending on the subassembly 70 attached to the lane assembly 54.

Cutting lane assemblies 54*a* can include cutting subassemblies 70*a*. The cutting subassembly 70*a* can be removably attached to the cutting lane assembly 54*a* and include a cutting blade 82, an anvil plate 84, a spring-loaded blade shoe 86, and a base 88. The cutting subassembly 70*a* can include a portion of a lane path 72 through which the composite tape passes. For example, the cutting blade 82 can be biased against the anvil plate 84 by the spring-loaded blade shoe 86 to create a scissoring cut as the pneumatic piston assembly 80 moves relative to the pneumatic cylinder 74 and cuts the composite tape as the composite tape passes through the lane path 72 of the cutting subassembly 70*a*. The cutting blade 82 and the anvil plate 84 when positioned relative to each other in a first position can permit the composite tape to pass through a lane path 72 and when the cutting blade 82 is moved relative to the anvil plate 84, the tape can be cut. When in the first position, openings in the cutting blade 82 and openings in the anvil plate 84 and base 88 can at least partially define the lane paths 72. A fastener 92, such as an elongated member, pin, dowel, or threaded screw, can extend through an aperture 90 in the cutting lane assembly 54*a* and engage with the cutting subassembly 70*a* to secure it to the cutting lane assembly 54*a*. The fastener 92 can be removed from the cutting lane assembly 54*a* and the cutting subassembly 70*a* to release the subassembly 70*a* from the cutting lane assembly 54*a* for service or replacement. In this implementation, the fiber placement head 14 includes eight cutting lane assemblies 54*a*-four cutting lane assemblies 54*a* on the upper feed portion 42 and four cutting lane assemblies 54*a* on the lower feed portion 44. However, other implementations with greater or fewer cutting lane assemblies 54*a* are possible.

Other lane assemblies 54 include clamping lane assemblies 54*b* and restarting lane assemblies 54*c*. The clamping lane assemblies 54*b* and restarting lane assemblies 54*c* can include a plurality of lane paths 72 and include a pneumatic piston 80 for each lane path 72 that can be selectively actuated so that it slides to hold composite tape in place. A clamping subassembly 70*b* and a restarting subassembly 70*a* can each include a guide wheel 94 for holding composite tape while it is applied on the mold 20. Powered wheels 96 can be positioned on an opposite side of the composite tape so that the powered wheels 96 oppose corresponding guide wheels 94. The powered wheels 96 can be driven by an electric motor 98 having an output shaft that is coupled with the wheels 96. The powered wheels 96 can be rotated by the electric motor 98 to move the composite tape or the powered wheels 96 can be held immobile for firmly holding the composite tape. It is possible for the composite tape to be held immobile against a sprag (one-way) bearing, clutched shaft, or a stationary plate.

The guide wheel 94 contacts a side of the composite fiber tape opposite from the side contacted by the powered wheels 96 thereby squeezing the tape between the wheels. The guide wheel 94 can work in cooperation with the powered wheels 96 to either move composite tape through the lane paths 72 or hold the composite tape in place. The powered wheels 96 can be driven by the electric motor 98 while the guide wheels 94 can freely rotate and permit the composite fiber tape to move. Or the electric motor 98 can hold the powered wheels 96 still and the pneumatic piston 80 can be actuated to prevent the guide wheels 94 from rotating to hold the tape in place. The pneumatic piston 80 can move in response to the receipt of compressed air to selectively hold the guide wheel 94 immobile thereby holding the composite fiber in place. In this implementation, the fiber placement head 14 includes eight clamping lane assemblies 54*b* and eight restarting lane assemblies 54*c*-four clamp lane assemblies and four restart lane assemblies on the upper feed portion 42 and four clamping lane assemblies 54*b* and four restarting lane assemblies 54*c* on the lower feed portion 44. In this implementation, the fiber placement head 14 can include twenty-four lane assemblies 54 including the cutting lane assemblies 54*a*. However, other implementations with greater or fewer lane assemblies 54 are possible.

The robotic arm 12 can move the fiber placement head 14 relative to the mold 20 to create a composite part. The robotic arm 12, the powered wheels 96, the cutting lane assemblies 54*a*, the clamping lane assemblies 54*b*, and the restarting lane assemblies 54*c* work in concert to apply composite tape to the mold 20. The restarting lane assemblies 54*c* can move the composite fiber through the lanes 72 until it reaches the compaction roller 34. The clamping lane assemblies 54*b* can then be actuated to hold the composite fiber preventing it from moving within the lanes 72. The compaction roller 34 can then be moved into contact with the mold 20 and apply an end of the composite tape to the mold 20. The clamping lane assemblies 54*b* can release the composite fiber and the robotic arm 12 moves the fiber placement head 14 over the mold 20 and the compaction roller 34 can apply the composite tape to the mold 20. Once a defined amount of composite tape has been applied to the mold 20, the clamping lane assemblies 54*b* can be actuated to hold the composite tape from the spools 26 in place and the cutting lane assemblies 54*a* can be actuated to cut the desired length of composite tape that is applied to the mold 20. The restarting lane assemblies 54*c* can be engaged and the clamping assemblies 54*b* disengaged to permit additional composite tape to be supplied to the compaction roller 34 so that a new course of composite tape can be applied to the mold 20.

Figure 13:
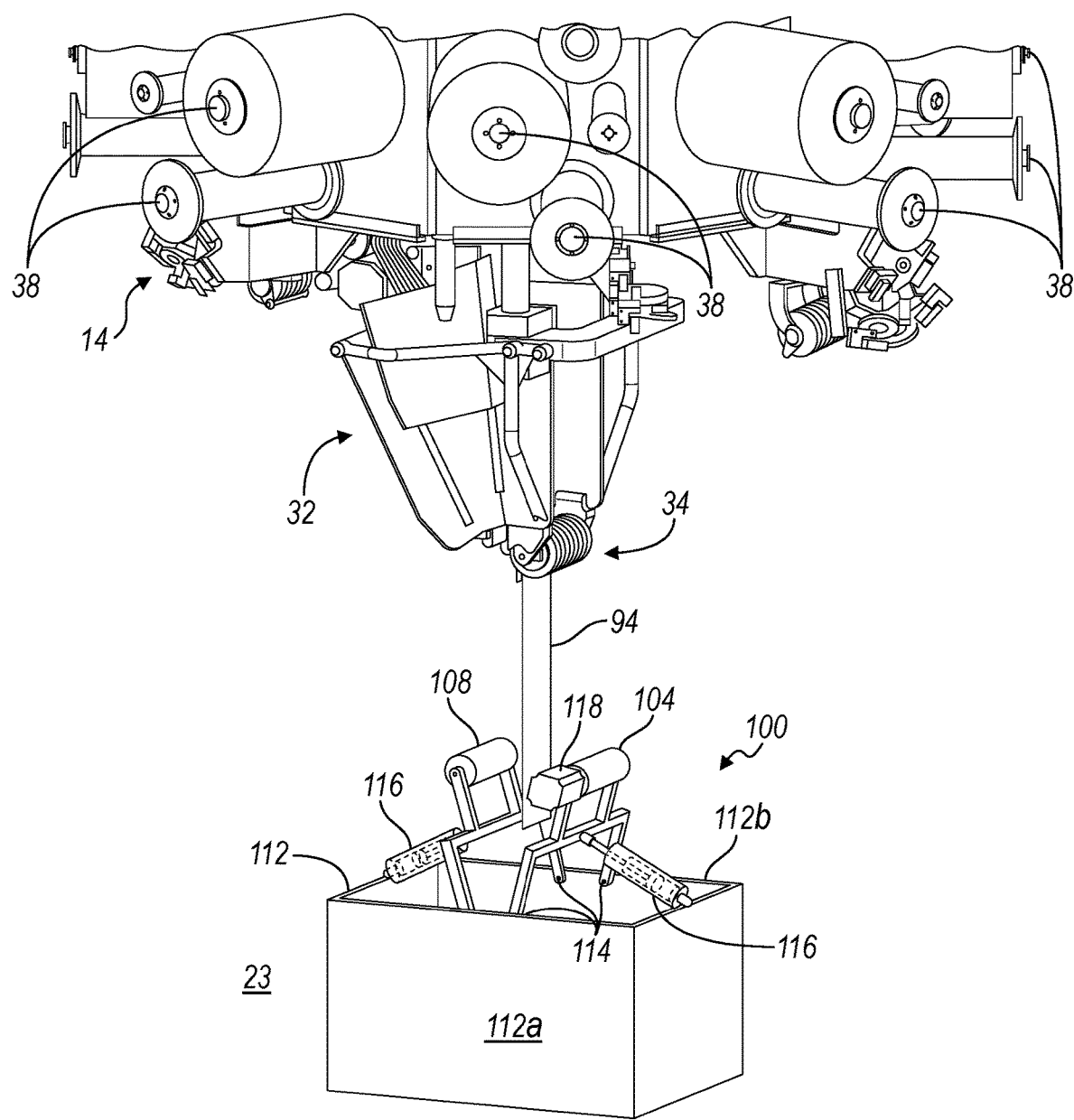
FIG. 13 is a perspective view of an implementation of a portion of a fiber placement head and a scrap collection assembly.
Figure 14:
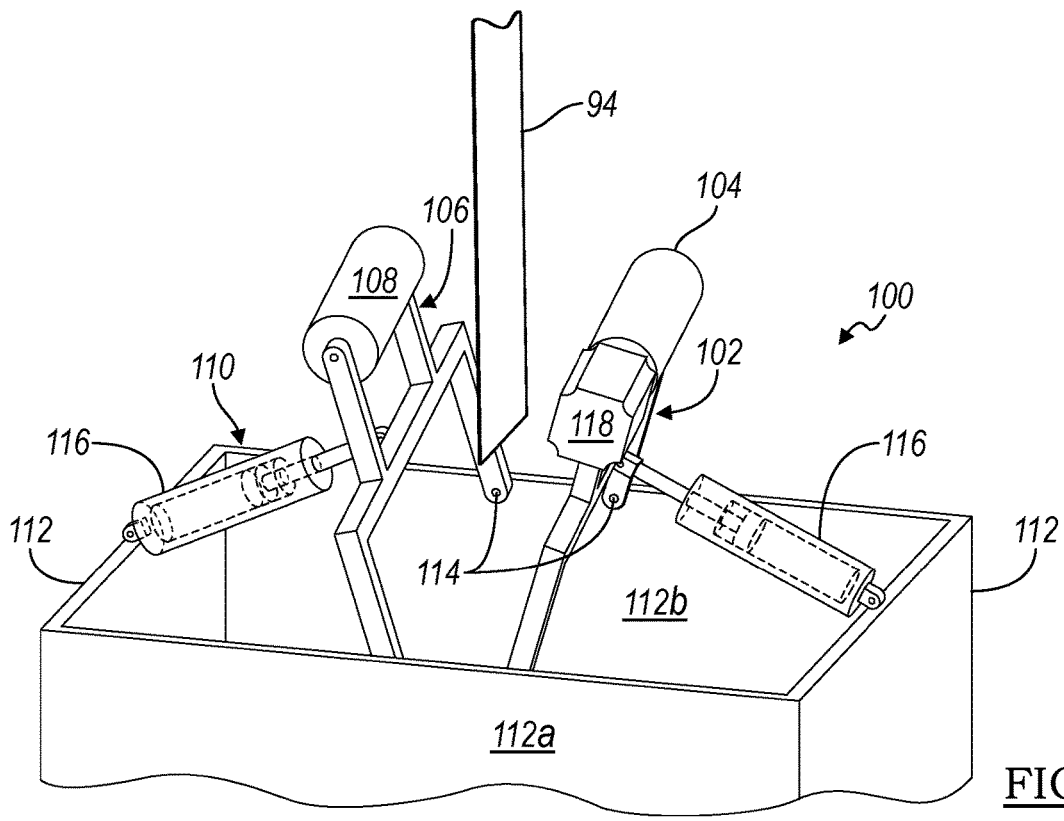
FIG. 14 is a perspective view of an implementation of a scrap collection assembly.
Figure 15:
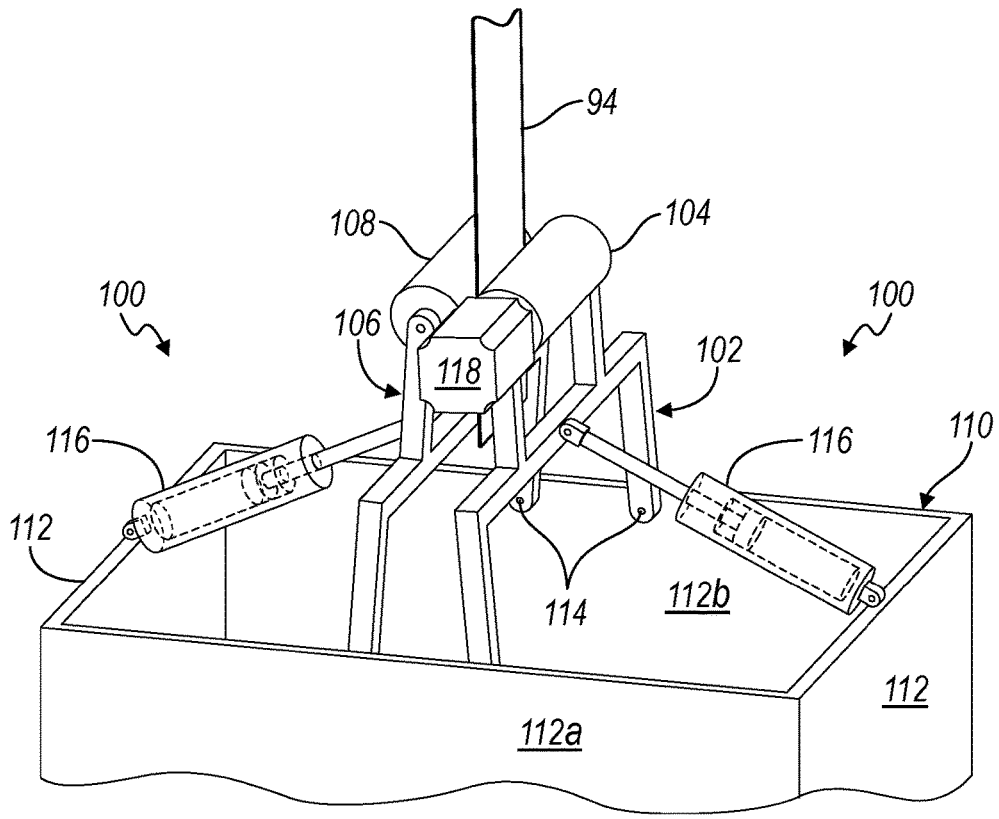
FIG. 15 is another perspective view of an implementation of a scrap collection assembly

In FIG. 13, the fiber placement head 14 is shown in the workspace 23 in position to deposit a scrap segment 94 of composite tape in the scrap collection assembly 100. The scrap collection assembly 100 can include a first roller assembly 102 with a driven roller 104, and a second roller assembly 106 with an idler roller 108, each pivotably mounted to a scrap collection bin 110. The scrap collection assembly 100 can be positioned in the workspace 23 near the mold 20 where a workpiece is created. The scrap collection bin 110 can have rigid vertically-extending sides and bottom affixed to the sides such that the bin 110 is open at the top. In some implementations, the scrap collection bin 110 can have a removable container that collects the scrap pieces. The first roller assembly 102 and the second roller assembly 106 can attach to opposite vertical sides 112*a* and 112*b* via pivots 114 that permit the first roller assembly 10 and the second roller assembly 16 to move towards or away from a scrap segment 94 of composite tape.

Extendable pistons 116 can couple to the first roller assembly 102 and the second roller assembly 106 as well as to the scrap collection bin 110. The pistons 116 can be pneumatically actuated to move the first roller assembly 102 and the second roller assembly 106 about the pivots so that the driven roller 104 and the idler roller 108 contact opposite sides of the scrap segment 94. An electric motor 118 can be coupled to one end of the shaft about which the driven roller 106 rotates. Once the pistons 116 have extended and the rollers 104, 108 engage the scrap segment 94, the electric motor 118 can rotate the driven roller 104 to pull the segment 94 out of and away from the fiber placement head 14. The scrap segment 94 can then fall into the scrap collection bin 110 and the pistons 116 retract moving the rollers 104, 108 away from each other into a position ready to engage/remove additional scrap segments. The robotic arm 12 can then move the fiber placement head 14 away from the scrap collection assembly 100 and towards the mold 20 to resume forming the workpiece.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A stationary scrap collection assembly for use with a separate fiber placement machine, comprising:
   a stationary scrap bin configured to receive scrap pieces of composite tape;
   a first roller assembly, including a first roller coupled to the stationary scrap bin, wherein the first roller is biased to engage a first side of composite tape received from the fiber placement machine;
   a second roller assembly, including a second roller coupled to the stationary scrap bin in opposition to the first roller, wherein the second roller is biased in opposition to the first roller to engage a second side of composite tape, opposite the first side, received from the fiber placement machine,
   wherein the rollers are arranged to be moved toward or away from the composite tape by actuators engage opposite sides of the composite tape and, pull a portion of the composite tape from the fiber placement machine for deposit into the stationary scrap bin, wherein the actuators are connected to the roller assemblies and the stationary scrap bin.

2. The stationary scrap collection assembly recited in claim 1, wherein the stationary scrap bin is open at one end.

3. The stationary scrap collection assembly recited in claim 1, further comprising a pivot about which the first roller assembly moves and another pivot about which the second roller assembly moves.

4. The stationary scrap collection assembly recited in claim 1, wherein the stationary scrap bin is positioned within a workspace of the fiber placement machine.

5. The stationary scrap collection assembly recited in claim 1, wherein an electric motor powers one of the rollers.

6. The stationary scrap collection assembly recited in claim 1, further comprising a fiber placement head with a creel and a plurality of spools that carry composite tape for the head.

7. A stationary scrap collection assembly for use with a separate fiber placement machine, comprising:
   a stationary scrap bin, configured to receive scrap pieces of composite tape, open at one end;
   a first roller assembly pivotably attached to the stationary scrap bin, including a first roller coupled to the stationary scrap bin, wherein the first roller is biased to engage a first side of composite tape received from the fiber placement machine;
   a second roller assembly pivotably attached to the stationary scrap bin, including a second roller coupled to the stationary scrap bin in opposition to the first roller, wherein the second roller is biased in opposition to the first roller to engage a second side of composite tape, opposite the first side, received from the fiber placement machine,
   wherein the first roller assembly and the second roller assembly are arranged to be moved toward or away from the composite tape about pivots by actuators to engage opposite sides of the composite tape, rotate the roller of the first roller assembly, and pull a portion of the composite tape into the stationary scrap bin, wherein the actuators are connected to the roller assemblies and the stationary scrap bin.

8. The stationary scrap collection assembly recited in claim 7, wherein the stationary scrap bin is positioned within a workspace of the fiber placement machine.

9. The stationary scrap collection assembly recited in claim 7, wherein an electric motor rotates the roller of the first roller assembly.

10. The stationary scrap collection assembly recited in claim 7, further comprising a fiber placement head with a creel and a plurality of spools that carry composite tape for the head.

\* \* \* \* \*